(12) United States Patent
Hobbs et al.

(10) Patent No.: US 11,867,274 B2
(45) Date of Patent: Jan. 9, 2024

(54) APPARATUS FOR SECURING A SPROCKET TO A SPROCKET CARRIER

(71) Applicants: James Hobbs, Bristol (GB); Lee Michele Ricciardi, Berkeley (GB)

(72) Inventors: James Hobbs, Bristol (GB); Lee Michele Ricciardi, Berkeley (GB)

( * ) Notice: Subject to any disclaimer, the term of this patent is extended or adjusted under 35 U.S.C. 154(b) by 422 days.

(21) Appl. No.: 17/264,285

(22) PCT Filed: Aug. 9, 2019

(86) PCT No.: PCT/GB2019/052238
§ 371 (c)(1),
(2) Date: Jan. 28, 2021

(87) PCT Pub. No.: WO2020/030922
PCT Pub. Date: Feb. 13, 2020

(65) Prior Publication Data
US 2021/0277986 A1    Sep. 9, 2021

(30) Foreign Application Priority Data

Aug. 9, 2018    (GB) ...................................... 1812953

(51) Int. Cl.
*F16H 55/30*    (2006.01)
*F16B 35/04*    (2006.01)
*F16H 55/10*    (2006.01)

(52) U.S. Cl.
CPC ........... *F16H 55/30* (2013.01); *F16B 35/041* (2013.01); *F16H 55/10* (2013.01)

(58) Field of Classification Search
CPC ........ F16H 55/30; F16H 55/12; F16H 55/171; F16H 55/46; F16H 7/06; B62D 21/183; B62D 55/135

(Continued)

(56) References Cited

U.S. PATENT DOCUMENTS 1,434,690 A * 11/1922 Edwards ................. F16D 1/033
464/182
1,578,983 A * 3/1926 Gossett .................. D03D 51/00
74/568 R (Continued)

FOREIGN PATENT DOCUMENTS

JP        2002362101 A     12/2002

OTHER PUBLICATIONS

BMI Karts & Parts, Replacement Wheel Hub Stud, 2019, BMIKarts. com, https://www.bmikarts.com/M10-X-1-14--Replacement-Wheel-Hub-Stud_p_8382.html (accessed Jan. 23, 2019) (Note bolt with head, knurled portions and thread that is suitable in size to fit the holes of well-known go kart sprocket carriers.).

(Continued)

*Primary Examiner* — Henry Y Liu
(74) *Attorney, Agent, or Firm* — BREYERS INTELLECTUAL PROPERTY LTD.

(57) ABSTRACT

A sprocket assembly (101) comprises a sprocket carrier (102), a sprocket (103), and a plurality of fixing devices (104) for use in securing the sprocket (103) to the sprocket carrier (102). Each fixing device (104) comprises a bolt (601) and a nut (602), the nut (602) engageable with a threaded shank portion (604) of the bolt (601), and the bolt (601) insertable through a fixing aperture (401) of the sprocket carrier (102) into a fitted condition in which the bolt (601) is retained within the sprocket carrier (102) by an interference fit between a knurled shank portion (605) of the bolt (601) and the sprocket carrier (102). A sprocket (103), a sprocket carrier (102), and a sprocket protector (106) for use within the sprocket assembly (101).

18 Claims, 12 Drawing Sheets

US 11,867,274 B2

Page 2

(58) Field of Classification Search
USPC .......................................................... 474/152
See application file for complete search history.

(56) References Cited

U.S. PATENT DOCUMENTS

| | | | | |
|---|---|---|---|---|
| 2,622,418 | A * | 12/1952 | Howison | F16D 3/70 |
| | | | | 474/94 |
| 3,109,326 | A * | 11/1963 | Holtan | F16H 3/12 |
| | | | | 192/48.91 |
| 3,115,350 | A * | 12/1963 | Quick, Jr. | B60G 1/02 |
| | | | | 180/58 |
| 3,162,057 | A * | 12/1964 | Burrell | F16H 55/30 |
| | | | | 474/902 |
| 3,304,743 | A * | 2/1967 | Paulsen | F16D 3/70 |
| | | | | 464/72 |
| RE26,608 | E * | 6/1969 | Hopkins | B62M 11/06 |
| | | | | 180/230 |
| 3,789,687 | A * | 2/1974 | Cutter | F16H 55/12 |
| | | | | 474/902 |
| 3,978,829 | A * | 9/1976 | Takahashi | F01L 1/352 |
| | | | | 74/568 R |
| 4,043,214 | A * | 8/1977 | Westlake | F16H 55/30 |
| | | | | 74/447 |
| 4,058,023 | A * | 11/1977 | Smith | F16H 55/12 |
| | | | | 474/902 |
| 4,095,371 | A * | 6/1978 | Knippel | E05F 11/53 |
| | | | | 49/352 |
| 4,123,112 | A * | 10/1978 | Mills | B60B 25/22 |
| | | | | 152/413 |
| 4,240,303 | A * | 12/1980 | Mosley | F16H 57/04 |
| | | | | 474/151 |
| 4,261,214 | A * | 4/1981 | Watanabe | B62M 9/00 |
| | | | | 474/151 |
| 4,326,849 | A * | 4/1982 | Van Zijderveld | F16H 55/30 |
| | | | | 474/902 |
| 4,332,573 | A * | 6/1982 | Uchida | B62D 55/0963 |
| | | | | 474/94 |
| 4,674,762 | A * | 6/1987 | Nelson | B62K 5/00 |
| | | | | 280/282 |
| 4,708,698 | A * | 11/1987 | Ziegelmeyer | B65G 23/06 |
| | | | | 464/41 |
| 4,720,001 | A * | 1/1988 | Jensen | F16D 41/067 |
| | | | | 192/50 |
| 4,964,842 | A * | 10/1990 | Howard | F16H 55/171 |
| | | | | 474/96 |
| 5,221,236 | A * | 6/1993 | Raymer | B62M 9/16 |
| | | | | 474/134 |
| 5,240,087 | A * | 8/1993 | Parker | B62M 9/16 |
| | | | | 280/285 |
| 5,380,254 | A * | 1/1995 | Maguire | B62D 55/135 |
| | | | | 474/152 |
| 5,593,283 | A * | 1/1997 | Scott | F04D 19/002 |
| | | | | 416/169 A |
| 5,674,148 | A * | 10/1997 | Bouteille | B62D 55/135 |
| | | | | 475/331 |
| 5,702,316 | A * | 12/1997 | Cole | F16H 55/12 |
| | | | | 474/96 |
| 5,833,562 | A * | 11/1998 | Walker, Sr. | F16H 55/46 |
| | | | | 474/902 |
| 5,947,852 | A * | 9/1999 | Moretz | F16H 55/12 |
| | | | | 474/160 |
| 6,074,316 | A * | 6/2000 | Murrietta, Sr. | F16H 55/30 |
| | | | | 474/96 |
| 6,722,221 | B2 * | 4/2004 | Maxwell | F01L 1/02 |
| | | | | 474/902 |
| 7,344,463 | B2 * | 3/2008 | Reiter | B62M 9/10 |
| | | | | 474/160 |
| 7,651,173 | B2 * | 1/2010 | Fan | F16D 3/68 |
| | | | | 301/110.5 |
| 7,686,721 | B2 * | 3/2010 | Tabe | B62M 9/105 |
| | | | | 474/116 |
| 7,833,103 | B2 * | 11/2010 | Rehr | F16D 1/076 |
| | | | | 464/23 |
| 8,216,102 | B2 * | 7/2012 | Nicholson | E06B 9/171 |
| | | | | 74/89.2 |
| 9,314,357 | B2 * | 4/2016 | Kitaoka | A61F 2/915 |
| 9,879,752 | B1 * | 1/2018 | Hicken | F16H 55/30 |
| 2002/0084134 | A1 * | 7/2002 | Persson | B62M 6/10 |
| | | | | 280/281.1 |
| 2003/0199351 | A1 * | 10/2003 | Nichols | B62M 9/10 |
| | | | | 474/95 |
| 2005/0032596 | A1 * | 2/2005 | Nonoshita | B62K 19/16 |
| | | | | 474/178 |
| 2005/0282672 | A1 * | 12/2005 | Nonoshita | B62M 9/105 |
| | | | | 474/174 |
| 2006/0040776 | A1 * | 2/2006 | Hansen | B60B 27/023 |
| | | | | 474/160 |
| 2006/0128512 | A1 * | 6/2006 | Tetsuka | B62M 3/00 |
| | | | | 474/160 |
| 2006/0264286 | A1 * | 11/2006 | Hodjat | F16H 55/171 |
| | | | | 474/152 |
| 2007/0072715 | A1 * | 3/2007 | Hinterstocker | F01L 1/02 |
| | | | | 474/152 |
| 2007/0129193 | A1 * | 6/2007 | Nonoshita | B62M 9/10 |
| | | | | 474/160 |
| 2007/0161443 | A1 * | 7/2007 | Krisl | F16H 55/30 |
| | | | | 474/95 |
| 2007/0270260 | A1 * | 11/2007 | Latham | F16H 55/30 |
| | | | | 474/152 |
| 2008/0125261 | A1 * | 5/2008 | Sommers | B62J 13/00 |
| | | | | 474/144 |
| 2009/0042682 | A1 * | 2/2009 | Dal Pra' | F16H 55/30 |
| | | | | 474/160 |
| 2010/0009794 | A1 * | 1/2010 | Chiang | B62M 9/10 |
| | | | | 474/160 |
| 2010/0133020 | A1 * | 6/2010 | Matsui | B62D 55/20 |
| | | | | 474/218 |
| 2011/0183793 | A1 * | 7/2011 | Chan | B62M 6/55 |
| | | | | 474/69 |
| 2011/0300978 | A1 * | 12/2011 | Sakamoto | F16H 55/171 |
| | | | | 474/152 |
| 2013/0087013 | A1 * | 4/2013 | Sugimoto | B62M 9/105 |
| | | | | 74/594.2 |
| 2013/0143704 | A1 * | 6/2013 | Blank | B62M 9/10 |
| | | | | 474/152 |
| 2015/0093595 | A1 * | 4/2015 | Asakawa | F16H 1/02 |
| | | | | 428/656 |
| 2015/0211623 | A1 * | 7/2015 | Inui | B23K 15/04 |
| | | | | 219/121.64 |
| 2015/0217834 | A1 * | 8/2015 | Iwai | B62M 9/105 |
| | | | | 474/152 |
| 2016/0165798 | A1 * | 6/2016 | De Bacco | A01D 69/00 |
| | | | | 56/153 |
| 2018/0079467 | A1 * | 3/2018 | Hirose | F16H 55/30 |

OTHER PUBLICATIONS

Value Fastener, Ribbed Neck Carriage Bolts, 2019, ValueFastener. com, https://www.valuefastener.com/carriage-bolts/ribbed-neck-carriage-bolts (accessed Jan. 23, 2019) (Note ribbed neck bolts are well known and can be purchased in many sizes, including sizes that would fit commercially available go kart sprocket carries.).

Prime-Line, Prime-Line Ribbed Neck Bolts with Nuts, Nov. 13, 2016, Amazon.com, https://www.amazon.com/Prime-Line-Products-849-2100-6952-Ribber-Bolts/dp/B003JK0J11 (accessed Jan. 23, 2019) (Note knurled bolt with accompanying nut, which would be suitable for engaging with the mounting holes of well-known commercially available go kart sprocket carriers.).

Go Kart Supply, Sprocket assembly parts, Aug. 25, 2017, GoKartSupply. com, https://web.archive.org/web/20170825085750/https://www.gokartsupply.com/sprocket.htm (accessed Jan. 23, 2019) (Note various prior art examples of go kart sprocket carriers ("hubs"), sprockets (including split sprockets) and nuts and bolts for fixing them together. Mounting holes are commonly of 3/8" or 1/4" diameter.).

Kartech, Kartech Quick Change Sprocket, Jul. 16, 2009, Youtube. com, https://www.youtube.com/watch?v=gcKohmfVQKE (accessed

(56) References Cited

OTHER PUBLICATIONS

Jan. 23, 2019) (Note sprocket with "key-hole" shaped mounting holes, mounted to sprocket carrier by nuts and bolts.).

Truck Parts HQ, Automann Double Ended Wheel Stud, accessed Jan. 23, 2019, TruckPartsHQ.com, https://www.truckpartshq.com/automann-double-ended-wheel-stud-201-7023r/ (accessed Jan. 23, 2019) (Note wheel stud has a knurled portion and thread one side of the middle and just a thread the other side.).

* cited by examiner

APPARATUS FOR SECURING A SPROCKET TO A SPROCKET CARRIER

FIELD OF THE INVENTION

The present invention relates to apparatus for releasably securing a sprocket to a sprocket carrier, in particular to apparatus for releasably securing a sprocket to a sprocket carrier of an axle of a vehicle having a chain drive power transmission system, more particularly to apparatus for releasably securing a sprocket to a sprocket hub of a kart, and more specifically to a sprocket assembly.

BACKGROUND OF THE INVENTION

Karting is type of motorsport in which karts are raced wheel-to-wheel on a race track, with the winner being the first to complete a designated distance. Different vehicle specifications apply to different race classes.

A known type of racing kart comprises a chain drive power transmission system, in which a drive chain extends between, and meshes with the teeth of, a front (driving) sprocket and a rear (driven) sprocket. Depending on the configuration of the vehicle, the rear axle may be a fixed axle or a live axle.

Replacement of a sprocket in a chain drive power transmission system may be required due to damage or general wear and tear. Another reason to replace a sprocket is to alter the gear ratio, which determines top speed and acceleration performance, in view of such factors as track size, layout and/or conditions, driver ability and chassis setup.

Typically, a rear sprocket for a go kart is provided as a unitary component that defines a plurality of fixing apertures therein. To install the sprocket, the sprocket is pushed over bolts and nuts are thereafter engaged with the bolts to secure the sprocket in place. To remove the sprocket, the nuts are disengaged from the bolts and the sprocket is thereafter pulled away from the bolts. According to an alternative design, the rear sprocket is split into two halves, with each part defining fixing notches therein.

It is desirable to provide improvements relating to changing the rear sprocket of a racing kart.

SUMMARY OF THE INVENTION

According to a first aspect there is provided a sprocket assembly, comprising: a sprocket carrier, the sprocket carrier defining a plurality of fixing apertures for use in securing a sprocket to the sprocket carrier, a sprocket, the sprocket defining a plurality of fixing apertures for use in securing the sprocket to a sprocket carrier, and a securing arrangement for releasably securing the sprocket to the sprocket carrier; wherein said securing arrangement comprises a plurality of fixing devices; each of said plurality of fixing devices comprises a bolt and a nut, the bolt having a head portion, a threaded shank portion and a knurled shank portion, the knurled shank portion disposed between the threaded shank portion and the head portion, and the nut engageable with the threaded shank portion of the bolt; the bolt of each of said plurality of fixing devices insertable through one of the plurality of fixing apertures of the sprocket carrier into a fitted condition in which the bolt is retained within the sprocket carrier by an interference fit between the knurled shank portion of the bolt and the sprocket carrier.

The interference fit between the fixing devices and the sprocket carrier facilitates the changing of a sprocket.

The sprocket may comprise a plurality of fixing apertures for use in releasably securing the sprocket to the sprocket carrier, each of said plurality of fixing apertures of the sprocket comprises a first portion and a second portion, the second portion extending in a first circumferential direction from the first portion, the first portion shaped to allow the passage of a nut of one of the plurality of fixing devices therethrough and the second portion shaped to prevent the passage of said nut of said one of the plurality of fixing devices therethrough.

The design of the fixing apertures of the sprocket facilitates the changing of a sprocket. The sprocket may be a "single" sprocket or a "split" sprocket.

The sprocket assembly may further comprise a sprocket protector, the sprocket protector comprising a plurality of fixing apertures for use in releasably securing the sprocket protector to the sprocket carrier, each of said plurality of fixing apertures of the sprocket protector comprises a first portion and a second portion, the second portion extending in a first circumferential direction from the first portion, the first portion shaped to allow the passage of a nut of one of the plurality of fixing devices therethrough and the second portion shaped to prevent the passage of said nut of said one of the plurality of fixing devices therethrough.

The sprocket carrier may be a sprocket hub for the rear sprocket of a racing kart.

According to a second aspect there is provided a sprocket for use in the sprocket assembly of the first aspect, wherein said sprocket comprises a plurality of fixing apertures for use in releasably securing the sprocket to a sprocket carrier, each of said plurality of fixing apertures comprises a first portion and a second portion, the second portion extending in a first circumferential direction from the first portion, the first portion shaped to allow the passage of a nut of one of the plurality of fixing devices therethrough and the second portion shaped to prevent the passage of said nut of said one of the plurality of fixing devices therethrough.

According to a third aspect there is provided a sprocket protector for use in the sprocket assembly of the first aspect, wherein said sprocket protector comprises a plurality of fixing apertures for use in releasably securing the sprocket protector to the sprocket carrier, each of said plurality of fixing apertures of the sprocket protector comprises a first portion and a second portion, the second portion extending in a first circumferential direction from the first portion, the first portion shaped to allow the passage of a nut of one of the plurality of fixing devices therethrough and the second portion shaped to prevent the passage of said nut of said one of the plurality of fixing devices therethrough.

According to a fourth aspect there is provided a sprocket carrier for use in the sprocket assembly of the first aspect, wherein the sprocket carrier defines a plurality of fixing apertures for use in securing a sprocket to the sprocket carrier, and the sprocket carrier is provided with a plurality of fixing devices; each of said plurality of fixing devices comprising a bolt and a nut, the bolt having a head portion, a threaded shank portion and a knurled shank portion, the knurled shank portion disposed between the threaded shank portion and the head portion, and the nut engageable with the threaded shank portion of the bolt; and the bolt of each of said plurality of fixing devices inserted through one of the plurality of fixing apertures of the sprocket carrier into a fitted condition in which the bolt is retained within the sprocket carrier by an interference fit between the knurled shank portion of the bolt and the sprocket carrier.

According to a fifth aspect there is provided a vehicle provided with the sprocket assembly of the first aspect. The vehicle may be a racing kart.

Further particular and preferred aspects of the invention are set out in the accompanying dependent claims.

BRIEF DESCRIPTION OF THE DRAWINGS

The present invention will now be more particularly described, with reference to the accompanying drawings, in which.

DESCRIPTION

Illustrative embodiments and examples are described below in sufficient detail to enable those of ordinary skill in the art to embody and implement the apparatus, systems and/or processes described herein. It is to be understood that embodiments and examples can be provided in many alternate forms and the invention should not be construed as limited to the embodiments and examples set forth herein but by the scope of the appended claims.

Unless otherwise defined, all terms (including technical and scientific terms) used herein are to be interpreted as is customary in the art. In addition, features referred to herein in the singular can number one or more, unless the context clearly indicates otherwise. Similarly, the terms "comprises," "comprising," "includes", "including", "has" and/or "having," when used herein, specify the presence of the stated feature or features and do not preclude the presence or addition of one or more other features, unless the context clearly indicates otherwise.

Figure 1:
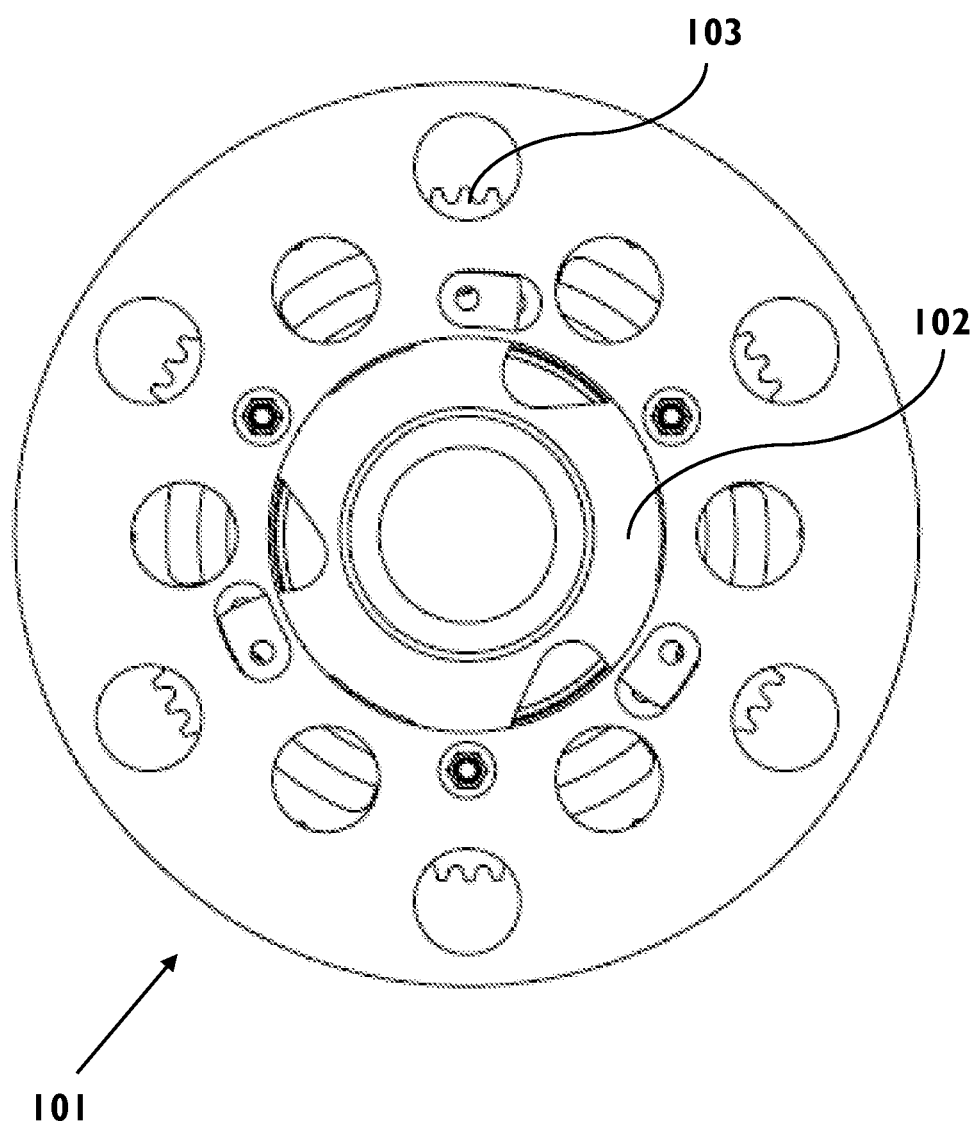
FIG. 1 shows a first view of an assembly comprising apparatus for securing a sprocket to a sprocket carrier.
Figure 2:
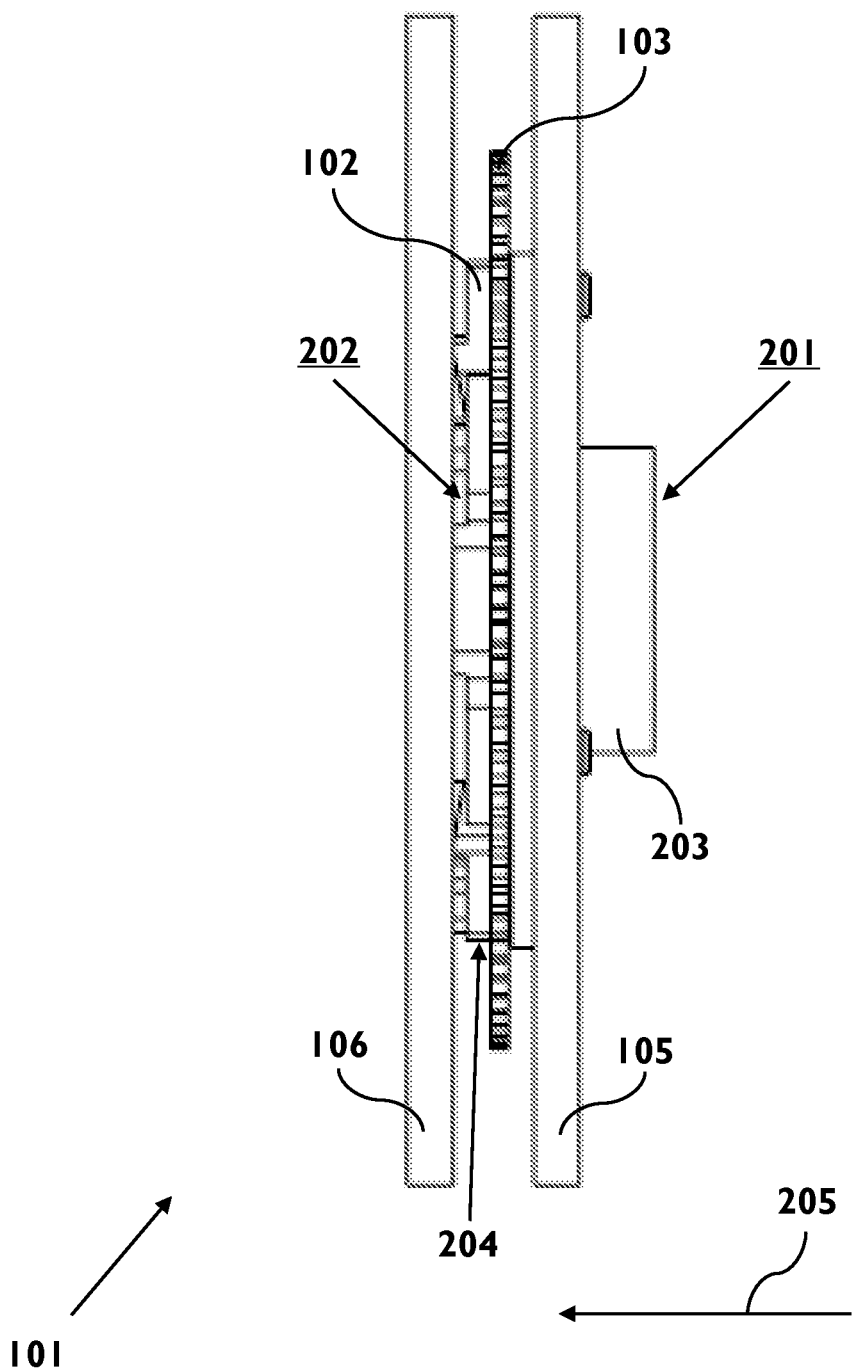
FIG. 2 shows a second view of the assembly of FIG. 1.
Figure 3:
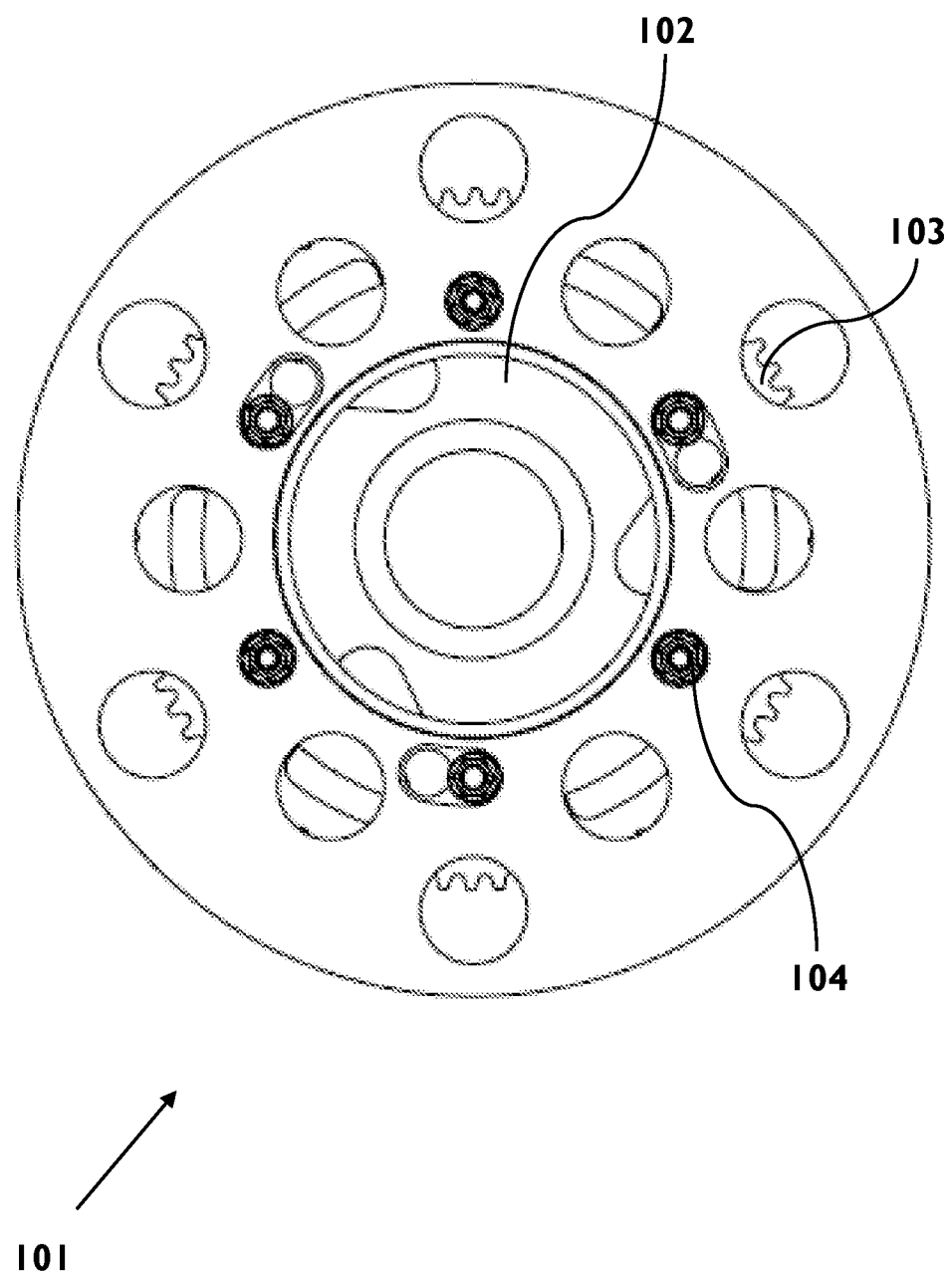
FIG. 3 shows a third view of the assembly of FIG. 1.

A sprocket assembly 101 is illustrated in FIGS. 1 to 3. An obverse face view is shown in FIG. 1, a side view is shown in FIG. 2 and a reverse face view is shown in FIG. 3.

The sprocket assembly 101 comprises a sprocket carrier 102, a sprocket 103, and a securing arrangement for releasably securing the sprocket 103 to the sprocket carrier 102, the securing arrangement comprising a plurality of fixing devices 104.

Optionally, and in this illustrated example, the sprocket assembly 101 further comprises a sprocket protector 105 and a second sprocket protector 106.

Figure 4:
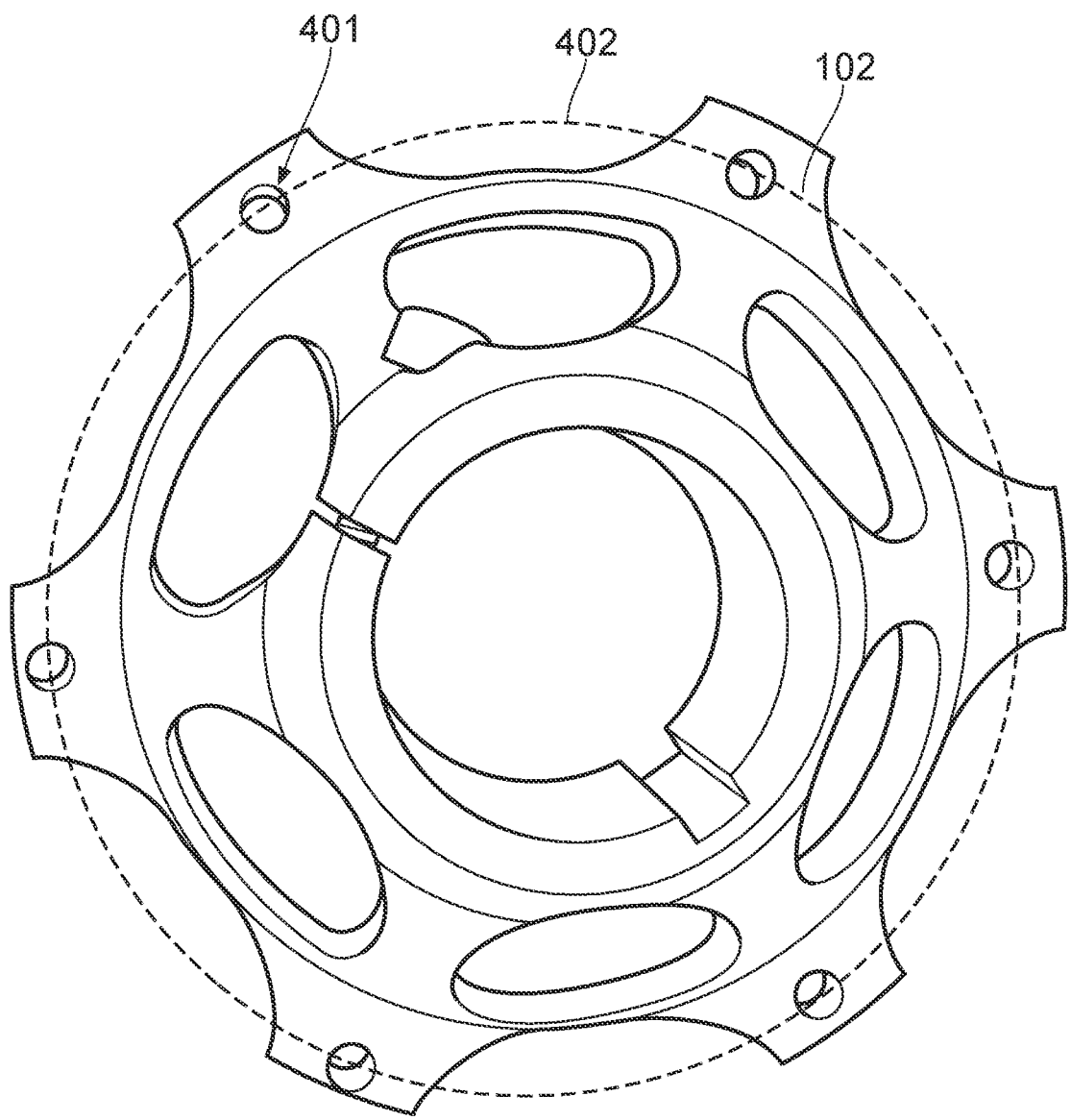
FIG. 4 shows a sprocket carrier.
Figure 5:
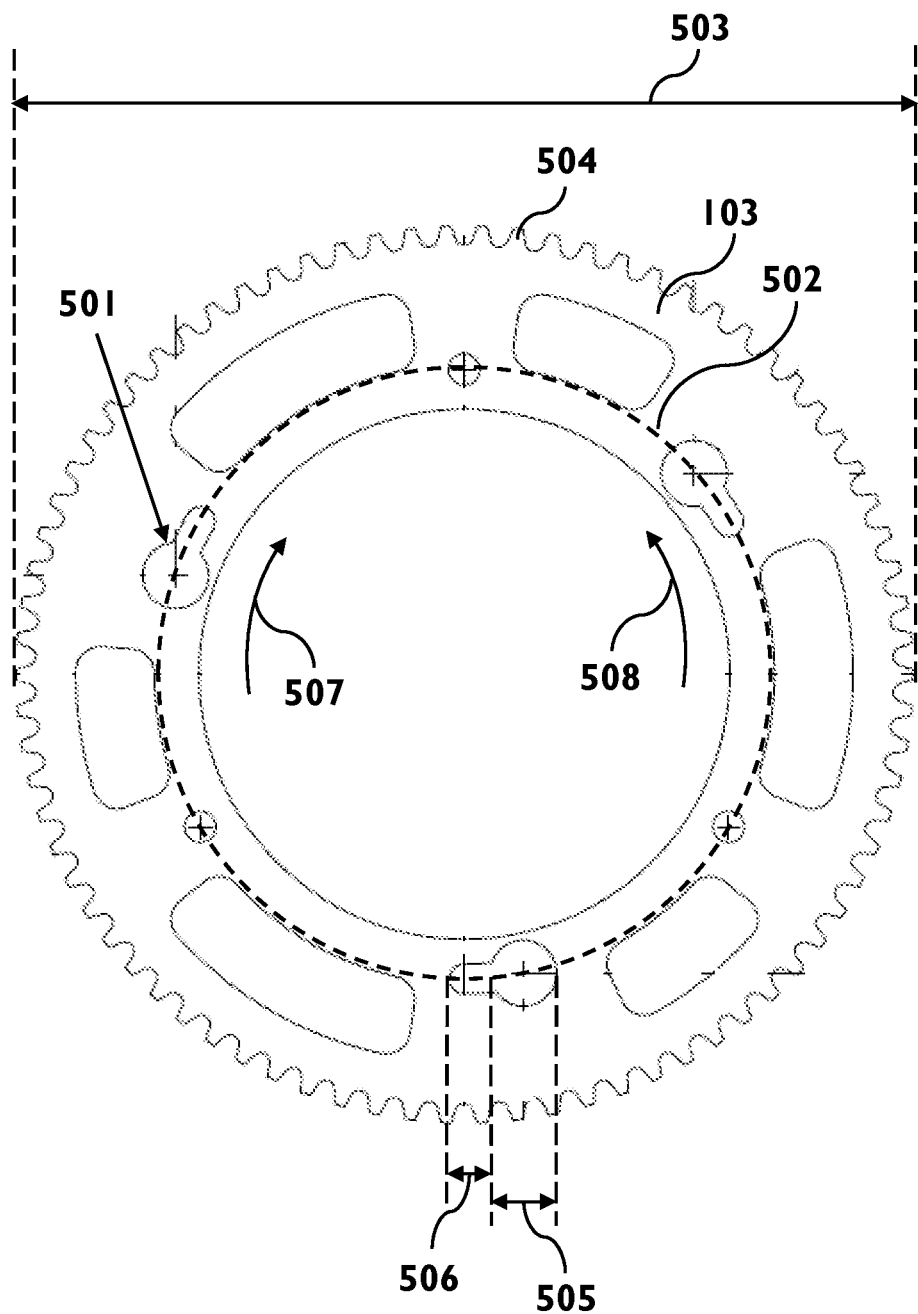
FIG. 5 shows a sprocket.
Figure 6:
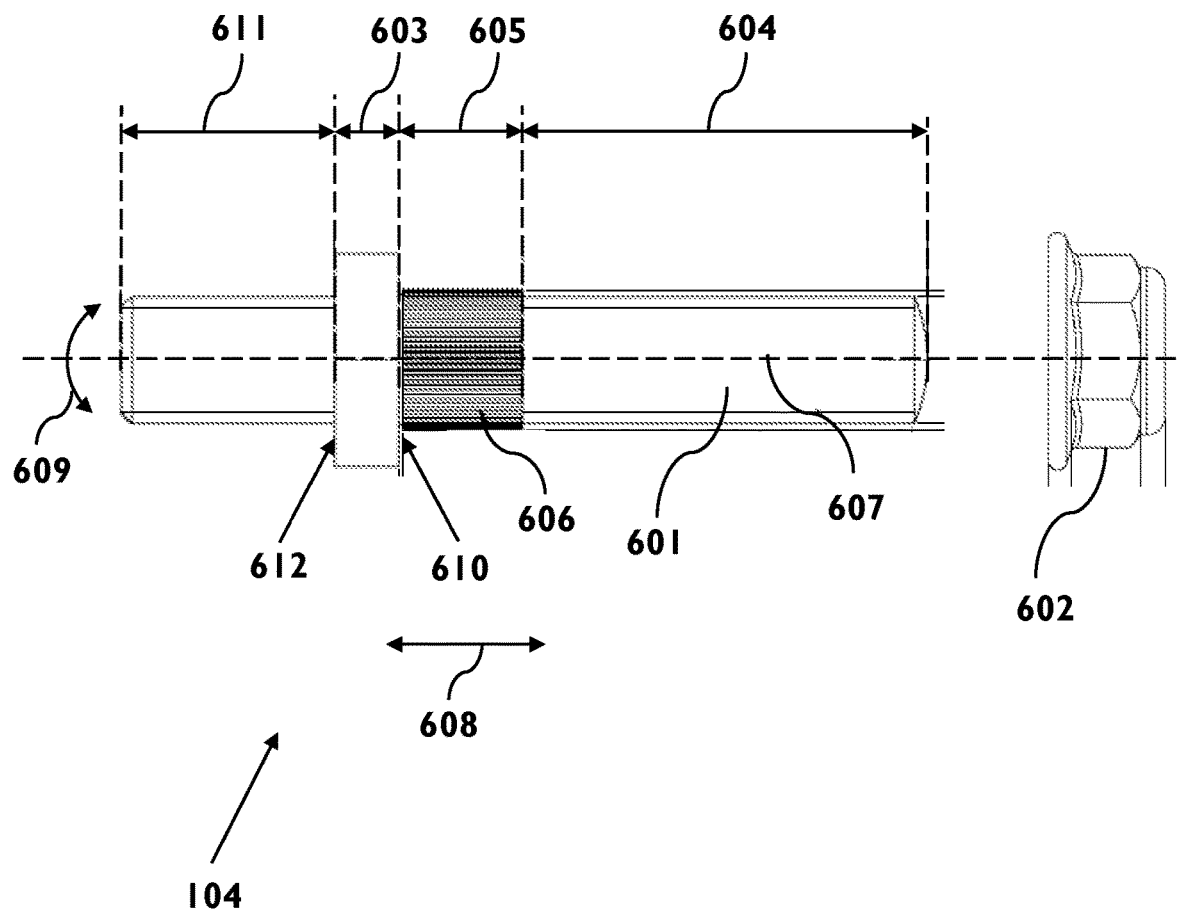
FIG. 6 shows a fixing device.

The sprocket carrier 102 is shown in further detail in FIG. 4, the sprocket 103 is shown in further detail in FIG. 5, and the fixing device 104 is shown in further detail in FIG. 6. The sprocket protector 105 is shown in further detail in FIG. 7.

Referring now to FIG. 4, sprocket carrier 102 defines a plurality of fixing apertures 401, for use in securing a sprocket, such as sprocket 103, to the sprocket carrier 102. The sprocket carrier 102 may define any suitable number of fixing apertures 401 in any suitable arrangement. In this example, the sprocket carrier 102 defines six fixing apertures 401, which are arranged equidistantly about a virtual circumference 402. The sprocket carrier 102 may be fabricated from any suitable material or combination of materials.

In this example, the sprocket carrier 102 is a prior art sprocket hub for a rear sprocket of a racing kart.

Referring now to FIG. 5, sprocket 103 defines a plurality of fixing apertures 501, for use in securing the sprocket 102 to a sprocket carrier, such as sprocket carrier 102. The sprocket 103 may define any suitable number of fixing apertures 501 in any suitable arrangement. In this example, the sprocket 103 defines three fixing apertures 501, which are arranged equidistantly about a virtual circumference 502.

The sprocket 103 may be fabricated from any suitable material or combination of materials. In this example, the sprocket 103 has a shape that is generally annular. The sprocket 103 may have any suitable external diameter 503 and may have any suitable number of teeth 504 with any suitable profile and arranged according to any suitable distribution pattern.

As shown, in this embodiment, sprocket 103 is a unitary component.

Referring now to FIG. 6, fixing device 104 comprises a bolt 601 and a nut 602. The bolt 601 has a head portion 603, a threaded shank portion 604, and a knurled shank portion 605, the knurled shank portion 605 disposed between the threaded shank portion 604 and the head portion 603. The nut 602 is engageable with the threaded shank portion 604 of the bolt 601. The nut 602 may be releasably engageable with the threaded shank portion 604 of the bolt 601. The threaded shank portion 604 may be provided with a thread of any suitable design. The knurled shank portion 605 may be provided with any suitable number of knurls 606 with any suitable profile and arranged according to any suitable distribution pattern.

Bolt 601 has a longitudinal central axis 607. In this example, each of the knurls 606 extends in a longitudinal direction, indicated by arrow 608, substantially parallel to the longitudinal central axis 607. In this example, the knurls 606 are evenly distributed, in a circumferential direction, indicated by arrow 609, around the longitudinal central axis 607.

The bolt 601 of the fixing device 104 is insertable through one of the plurality of fixing apertures 401 of the sprocket carrier 102 into a fitted condition in which the bolt 601 is retained within the sprocket carrier 102 by an interference fit between the knurled shank portion 605 of the bolt 601 and the sprocket carrier 102. The knurls 606 are therefore used to maintain the fixing device within the sprocket carrier 104 by frictional engagement with the inside surface of the fixing aperture 401 of the sprocket carrier 102.

After the bolt 601 has been fitted into the sprocket carrier 102, the nut 602 may be screwed onto the threaded shank portion 604 thereof in a tightening direction of rotation.

According to the illustrated example, the knurled shank portion 605 adjoins the head portion 603 and, after the bolt 601 has been inserted through the sprocket carrier 102, the nut 602 may be initially screwed onto the bolt 601 to such an extent that the bolt 601 abuts the sprocket carrier 102 and continued rotation thereof in the tightening direction causes the knurled shank portion 605 to be drawn through the sprocket carrier 102 further. Thereafter, the nut 602 may be rotated in a loosening direction, opposite the tightening direction of rotation, to space the nut 602 away from the sprocket carrier 102.

It is to be appreciated that the threaded shank portion 604 may extend to the knurled shank portion 605 or an unthreaded shank portion may be disposed between the threaded shank portion 604 and the knurled shank portion 605.

The fixing device 104 may be fitted to any suitable sprocket carrier. It is to be appreciated that the fixing device 104 may be provided as an original or retrofittable component. Thus, it is to be understood that the fixing device 104 may be provided as an individual component.

Each of the bolt 601 and the nut 602 of the fixing device 104 may be fabricated from any suitable material or combination of materials.

In this example, the threaded shank portion 604 is disposed on a first side 610 of the head portion 603 and the bolt 601 further comprises a threaded shaft portion 611 that is disposed on a second side 612 of the head portion 603, the second side 612 opposite the first side 610.

It is to be appreciated that the threaded shaft portion 611 may extend to the head portion 103 or an unthreaded shaft portion may be disposed between the threaded shaft portion 611 and the head portion 603.

Referring now to FIGS. 5 and 6, each fixing aperture 501 of the sprocket 103 comprises a first portion 505 and a second portion 506, the second portion 506 extending in a first circumferential direction, indicated by arrow 507, from the first portion 505.

The first portion 505 is shaped to allow the passage of nut 602 of fixing device 104 therethrough and the second portion 506 is shaped to prevent the passage of nut 602 of fixing device 104 therethrough.

Each of the first portion 505 and the second portion 506 of the fixing aperture 501 may have any suitable shape.

In this example, the first portion 505 has a shape that is generally circular and the second portion 506 has a shape that is generally rectangular with a semi-circular end. In this example, the fixing aperture 501 has a substantially key-hole overall shape.

Referring now to FIGS. 4, 5 and 6, the sprocket 103 is securable to the sprocket carrier 102 by a method of assembly that comprises the steps of (i) aligning the first portions 505 of the fixing apertures 501 of the sprocket 103 with nuts 602 engaged with bolts 601 retained within the sprocket carrier 102, (ii) mounting the sprocket 103, in an assembly direction, over the nuts 602; and (iii) rotating the sprocket 103 in a second circumferential direction, indicated by arrow 508, the second circumferential direction 508 opposite the first circumferential direction 507, to align the second portions 506 of the fixing apertures 501 of the sprocket 103 with the nuts 602 to prevent the passing of the sprocket 103, in a removal direction, the removal direction opposite the assembly direction, back over the nuts 602.

The sprocket 103 is subsequently releasable from the sprocket carrier by a method of removal that comprises the steps of (i) rotating the sprocket 103 in the first circumferential direction 507, to again align the first portions 505 of the fixing apertures 501 of the sprocket 103 with the nuts 602 and (ii) moving the sprocket 103 in the removal direction back over the nuts 602.

Thus, when the bolts 601 of the fixing devices 104 have been fitted to the sprocket carrier 102 and the nuts 602 engaged thereto, it is possible to mount a sprocket 103 to the sprocket carrier 102, to remove the sprocket 103 from the sprocket carrier 102, and to mount a replacement sprocket to the sprocket carrier 102 without disengaging the nuts 602 from the bolts 601. This advantageously reduces the likelihood of the nuts 602 being lost during a sprocket change. It is to be appreciated however that the nuts 602 may be rotated along the threaded shank portions 604 of the bolts 601 in the tightening direction, to hold a sprocket 103 in a desired position on the sprocket carrier 102 after mounting, and in the loosening direction, to release a sprocket 103 from the desired position on the sprocket carrier 102 before removal.

In addition, the interference fit between the bolt 601 and the sprocket carrier 102 beneficially functions to maintain the bolt 601 within the sprocket carrier 102 at a desired position and orientation. This serves to facilitate the mounting of a sprocket thereon and the removal of a sprocket therefrom. The interference fit also reduces the likelihood of the bolt 601 being lost if the nut 602 is not engaged therewith.

The shown sprocket 103 is a "single" sprocket. However, it is to be appreciated that a "split" sprocket version (not shown) may be provided. In an embodiment, each of two halves of the split sprocket is provided with a plurality of fixing apertures 501 for use in securing the part to a sprocket carrier.

Figure 7:
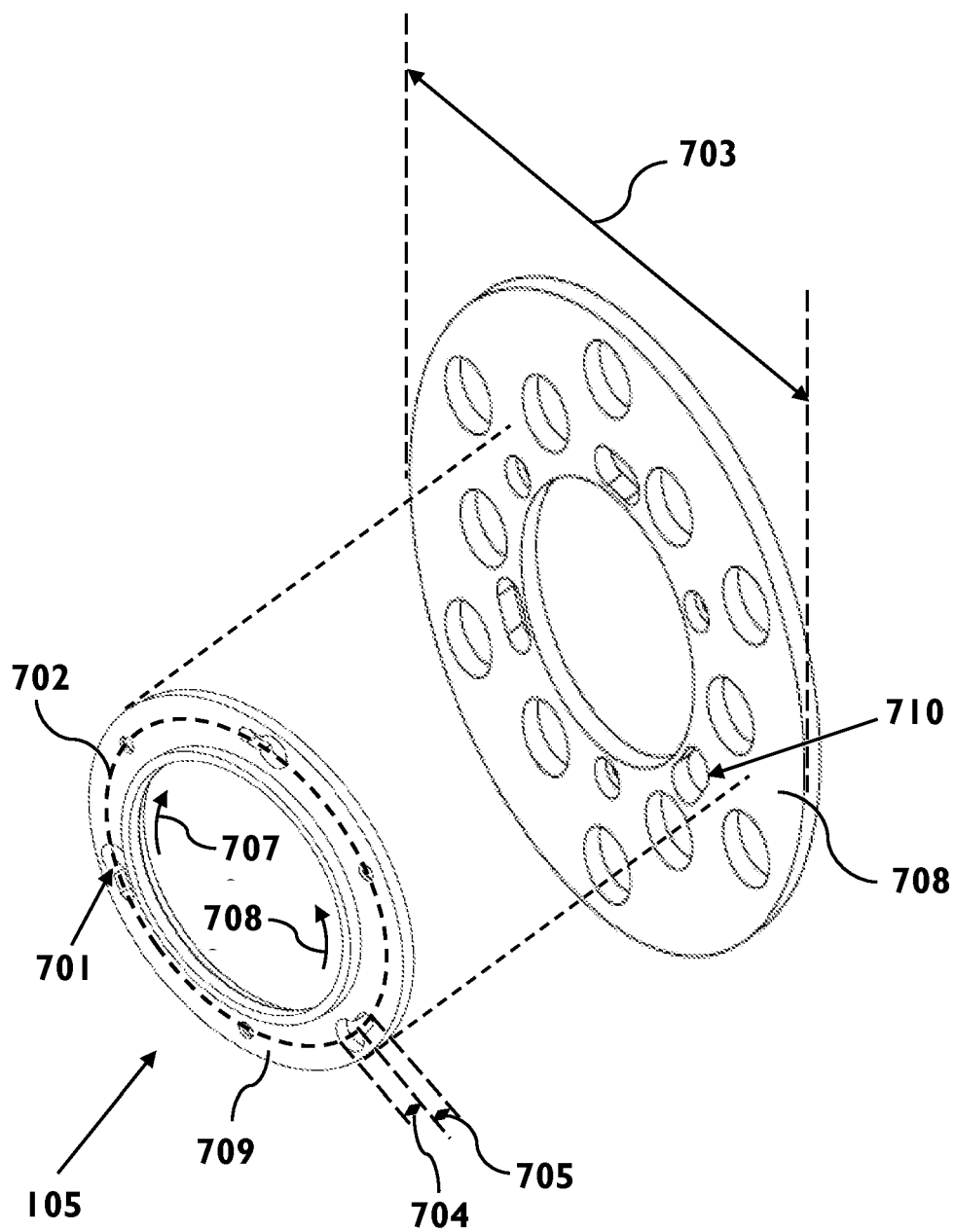
FIG. 7 shows a sprocket protector.

Referring now to FIG. 7, sprocket protector 105 defines a plurality of fixing apertures 701, for use in securing the sprocket protector 105 to a sprocket carrier, such as sprocket carrier 102. The sprocket protector 105 may define any suitable number of fixing apertures 701 in any suitable arrangement. In this example, the sprocket protector 105 defines three fixing apertures 701, which are arranged equidistantly about a virtual circumference 702.

In this example, the sprocket protector 105 has a shape that is generally annular. The sprocket protector 105 may have any suitable external diameter 703.

Each fixing aperture 701 of the sprocket protector 103 comprises a first portion 704 and a second portion 705, the second portion 705 extending in a first circumferential direction, indicated by arrow 706, from the first portion 704.

The first portion 704 is shaped to allow the passage of nut 602 of fixing device 104 therethrough and the second portion 705 is shaped to prevent the passage of nut 602 of fixing device 104 therethrough.

Each of the first portion 704 and the second portion 705 of the fixing aperture 701 may have any suitable shape.

In this example, the first portion 704 has a shape that is generally circular and the second portion 705 has a shape that is generally rectangular with a semi-circular end. In this example, the fixing aperture 701 has a substantially key-hole overall shape.

In an example, the plurality of fixing apertures 701 of the sprocket protector 105 correspond to the plurality of fixing apertures 501 of the sprocket 103 in size and shape.

The sprocket protector 105 is securable to, and releasable from, the sprocket carrier 102 in similar way as described hereinbefore for the sprocket 103. The sprocket protector 105 is securable to the sprocket carrier 102 after the sprocket 103 has been mounted onto the bolts 601 of the fixing devices 104. In this example, the sprocket protector 105 is securable to the sprocket carrier 102 using the same the fixing devices 104.

The sprocket protector 105 is securable to the sprocket carrier 102 by a method of assembly that comprises the steps of (i) aligning the first portions 704 of the fixing apertures 701 of the sprocket protector 105 with nuts 602 engaged with bolts 601 retained within the sprocket carrier 102, (ii) mounting the sprocket protector 105, in an assembly direction, over the nuts 602; and (iii) rotating the sprocket protector 105 in a second circumferential direction, indicated by arrow 707, the second circumferential direction 707 opposite the first circumferential direction 706, to align the second portions 705 of the fixing apertures 701 of the sprocket protector 105 with the nuts 602 to prevent the passing of the sprocket protector 105, in a removal direction, the removal direction opposite the assembly direction, back over the nuts 602.

The sprocket protector 105 is subsequently releasable from the sprocket carrier 102 by a method of removal that comprises the steps of (i) rotating the sprocket protector 105 in the first circumferential direction 706, to again align the first portions 704 of the fixing apertures 701 of the sprocket protector 105 with the nuts 602 and (ii) moving the sprocket protector 105 in the removal direction back over the nuts 602.

In this example, the sprocket protector 105 comprises a body portion 708 and a mounting portion 709 that is securable to the body portion 708 and in which the plurality of fixing apertures 701 are defined. The body portion 708 defines a plurality of apertures 710 that are shaped such that when the mounting portion 709 is secured to the body portion 708 with the plurality of fixing apertures 701 of the mounting portion 709 aligned with the plurality of apertures 710 of the body portion 708, the plurality of fixing apertures 701 of the mounting portion 709 are unobstructed.

The mounting portion 709 may be securable to the body portion 708 using any suitable type of fixing or fixings, such as adhesive or mechanical fasteners. In an example, the mounting portion 709 is releasably securable to the body portion 708.

It is to be appreciated that the mounting portion 709 may be provided as an original or retrofittable component. Thus, it is to be understood that the mounting portion 709 may be provided as an individual component.

The sprocket protector 105 may be fabricated from any suitable material or combination of materials. It is to be appreciated that, in an alternative example, the sprocket protector is provided as a unitary component.

In this example, the body portion and the mounting portion 709 may be fabricated from different materials. In this example, the body portion 708 is fabricated from a plastics material, such as nylon, and the mounting portion 709 is fabricated from a metal material, such as aluminium.

Reference will now be made again to FIG. 2, in which the sprocket assembly 101 is shown in the assembled condition.

The sprocket carrier 102 has a first side 201 and a second side 202, the second side 202 opposite the first side 201. The sprocket 103 is configured to be mounted to the sprocket carrier 102 from the first side 201 thereof, the sprocket protector 105 is configured to be mounted to the sprocket carrier 102 from the first side thereof 201, and the second sprocket protector 106 is configured to be mounted to the sprocket carrier 102 from the second side 202 thereof.

In this example also, the sprocket carrier 102 has an axle mounting portion 203 and a sprocket support plate, the position of which is indicated by arrow 204. In the shown assembled arrangement, travelling in the direction indicated by arrow 205, from the first side 201 to the second side 202 of the sprocket carrier 102, there is the sprocket protector 105, the sprocket 103, the sprocket support plate 204 and the second sprocket protector 106. Thus, the sprocket 103 is disposed between the sprocket support plate 204 and the sprocket protector 105, with the sprocket 103 located on one side of the sprocket support plate 204 and the second sprocket protector 106 located on the other side of the sprocket support plate 204.

It is to be appreciated that the second sprocket protector 106 may be similar to the sprocket protector 105 or may be any suitable prior art sprocket protector.

The second sprocket protector 106 may be secured to the sprocket carrier 102 in any suitable way. In this specific example, the second sprocket protector 106 may be secured to the sprocket carrier 102 is secured to the sprocket carrier 102 using the fixing devices 104; more particularly using the threaded shaft portion 611 thereof and a second nut (not shown in this Figure) engageable therewith. The second nut may be releasably engageable with the threaded shaft portion 611.

It is also to be understood that the sprocket 103 may be configured for use with an alternative fixing device to the fixing device 104. Thus, a customer may purchase the sprocket 103 and may secure the sprocket 103 to a sprocket carrier provided with, or using, fixing devices 104 as described herein or any suitable alternative fixing device. The sprocket 103 may therefore be provided with additional apertures for use with a suitable alternative fixing device.

It is likewise to be appreciated that the sprocket protector 106 may be configured for use with an alternative fixing device to the fixing device 104. Thus, a customer may purchase the sprocket protector 106 and may secure the sprocket protector 106 to a sprocket carrier provided with, or using, fixing devices 104 as described herein or any suitable alternative fixing device. The sprocket protector 103 may therefore be provided with additional apertures for use with a suitable alternative fixing device.

Figure 8:
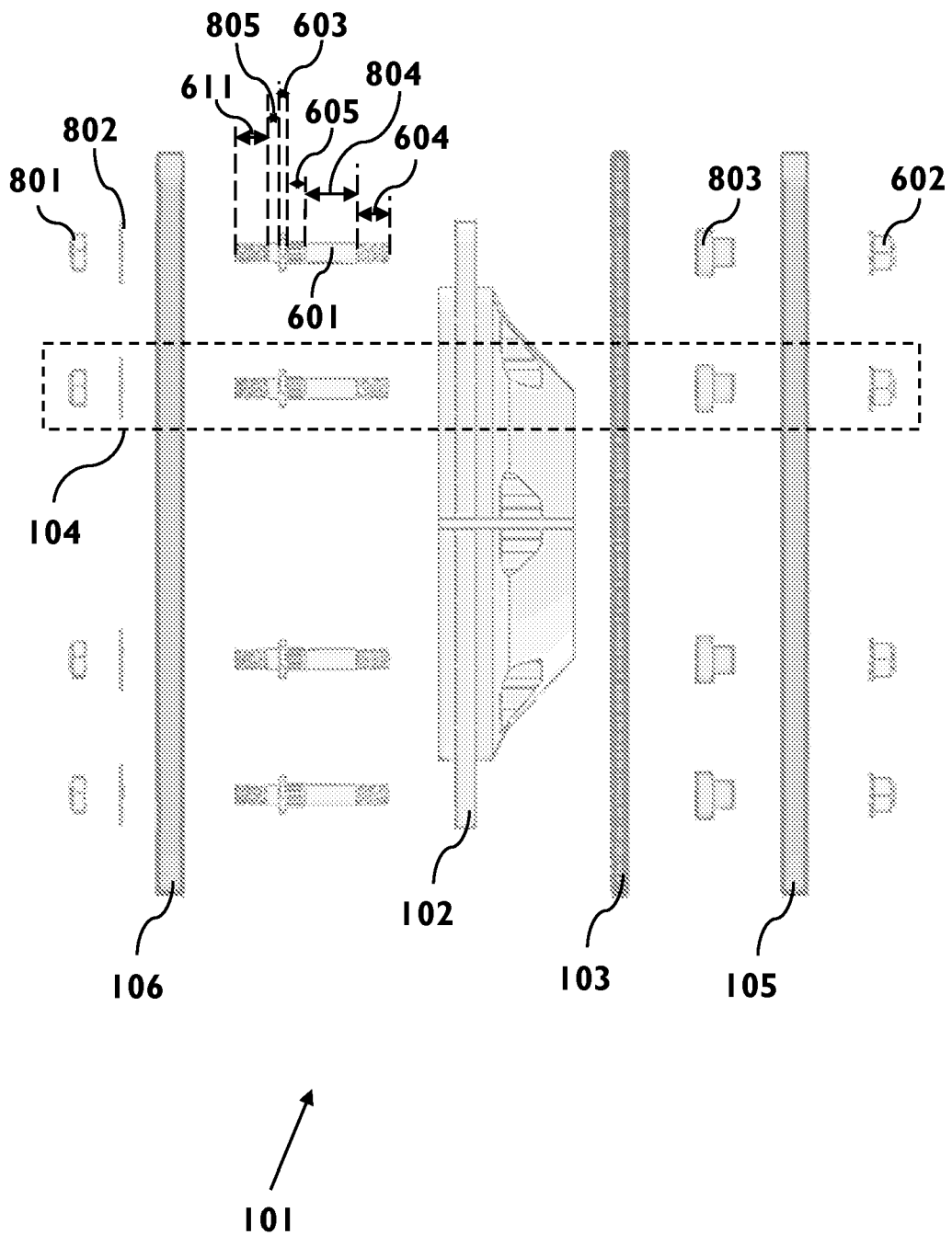
FIG. 8 shows a schematic exploded view of the assembly of FIG. 1.

A schematic exploded view of the sprocket assembly 101 is shown in FIG. 8.

In this Figure, second nut 801 of the fixing device 104, which is engageable with the threaded shaft portion 611 of the bolt 601, is illustrated. Also illustrated in this Figure is a washer 802, for use between the second nut 801 and the second sprocket protector 106, and a spacer 803, for use between the sprocket 103 and the sprocket protector 105.

According to this illustrated example, the bolt 601 has an unthreaded shank portion 804 between the threaded shank portion 604 and the knurled shank portion 605 and the bolt 601 also has an unthreaded shaft portion 805 between the threaded shank portion 611 and the head portion 603.

A first apparatus disclosed herein is a fixing device for securing a sprocket to a sprocket carrier, the fixing device comprising a bolt and a nut engageable with the bolt, the bolt having a knurled shank portion that is insertable through a fixing aperture of the sprocket carrier into a fitted condition in which the bolt is retained within the sprocket carrier by an interference fit between the knurled shank portion of the bolt and the sprocket carrier.

A second apparatus disclosed herein is a sprocket having fixing apertures, each of the fixing apertures having a first portion shaped to allow the passage of a nut of the first aspect therethrough and a second portion shaped to prevent the passage of the nut of the first aspect therethrough.

A third apparatus disclosed herein is a sprocket protector having fixing apertures, each of the fixing apertures having a first portion shaped to allow the passage of a nut of the first aspect therethrough and a second portion shaped to prevent the passage of the nut of the first aspect therethrough.

A first assembly disclosed herein comprises a sprocket carrier, the first apparatus and a sprocket. A second assembly disclosed herein comprises a sprocket carrier, the first apparatus, a sprocket and the third apparatus. A third assembly disclosed herein comprises a sprocket carrier, the first apparatus and the second apparatus. A fourth assembly disclosed herein comprises a sprocket carrier, the first apparatus, the second apparatus. and the third apparatus.

A first method disclosed herein comprises the steps of fitting the first apparatus to a sprocket carrier. A second method disclosed herein comprises the steps of fitting the first apparatus to a sprocket carrier and fitting the second apparatus to the first apparatus. A second method disclosed herein comprises the steps of fitting the first apparatus to a sprocket carrier, fitting the second apparatus to the first apparatus and fitting the third apparatus to the first apparatus. A fourth method disclosed herein comprises the steps of fitting the first apparatus to a sprocket carrier, securing the second apparatus to the sprocket carrier using the first apparatus, removing the second apparatus from the first apparatus and securing a replacement sprocket to the sprocket carrier using the first apparatus.

The present invention relates to use of a fixing device with a sprocket carrier, and a sprocket carrier provided with a plurality of fixing devices fitted thereto.

The present invention provides a quick release system for changing a sprocket, which is "universal" in that it can be used with any sprocket carrier. The ability to use the system with a sprocket carrier from any manufacturer is clearly advantageous. Another benefit of the quick release system for changing a sprocket of the present invention is that it can be used with sprocket protectors.

Use of the quick release system for changing a sprocket of the present invention provides for a significant reduction in time taken to complete a sprocket change. This is clearly beneficial in motor racing, during which the speed of a pit stop can win or lose a race.

In one trial, the design of the quick-change sprocket assembly of the present invention enabled a sprocket to be replaced in a time of approximately 2 minutes 10 seconds, which compares favourably to a sprocket change duration of approximately 3 minutes 20 seconds with a prior art sprocket assembly design.

Figure 9:
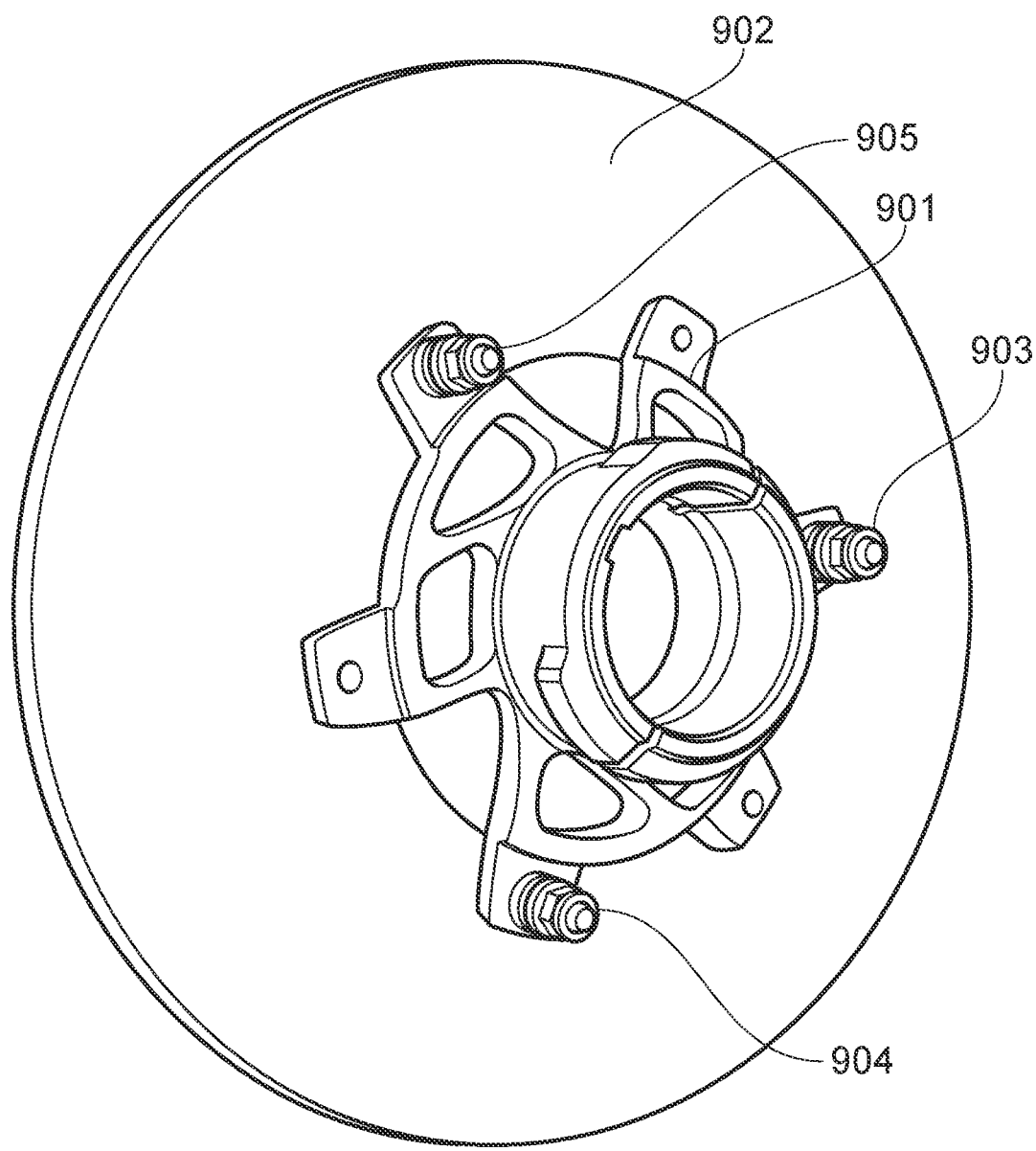
FIG. 9 shows a sprocket carrier and sprocket protector.
Figure 10:
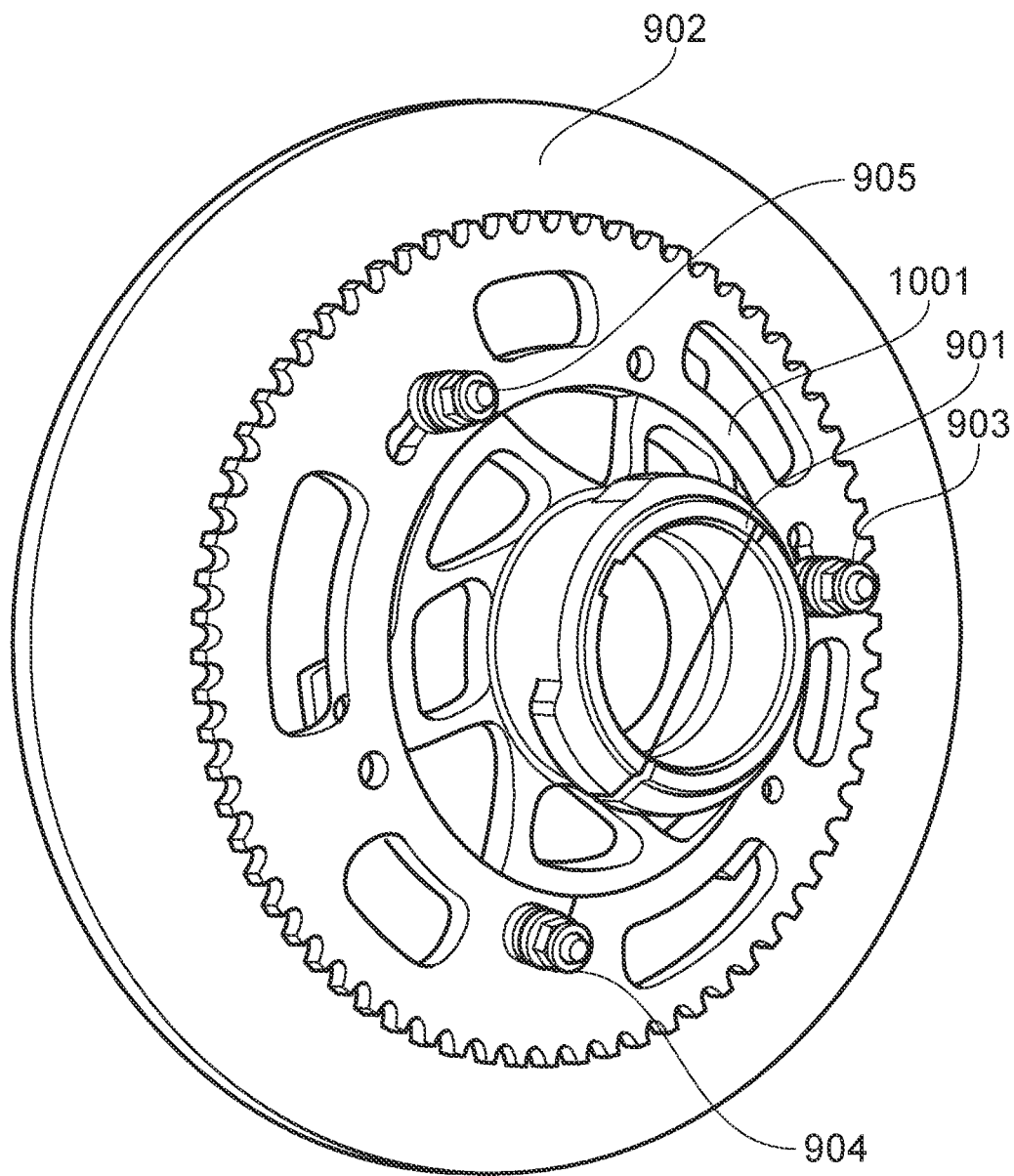
FIG. 10 shows the sprocket carrier and sprocket protector of FIG. 9 with a sprocket.

A sprocket carrier 901 and a sprocket protector 902 are shown in FIG. 9. Fixings 903, 904 and 905 are fitted to the sprocket carrier 901 in the manner described previously (using a frictional engagement). FIG. 10 shows the sprocket carrier 901, sprocket protector 902 and fixings 903, 904 and 905 of FIG. 9, with a "quick release" sprocket 1001 (having the key-hole shaped fixing apertures described previously) mounted to the sprocket carrier 901.

Figure 11:
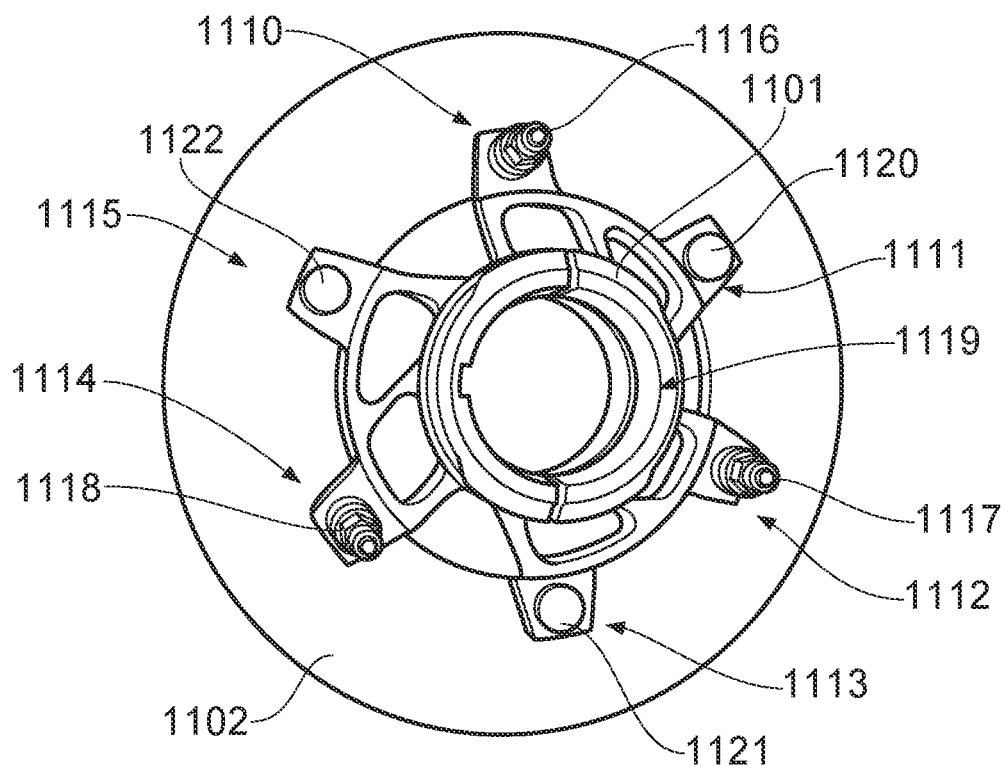
FIG. 11 shows a sprocket carrier and a sprocket.
Figure 11:
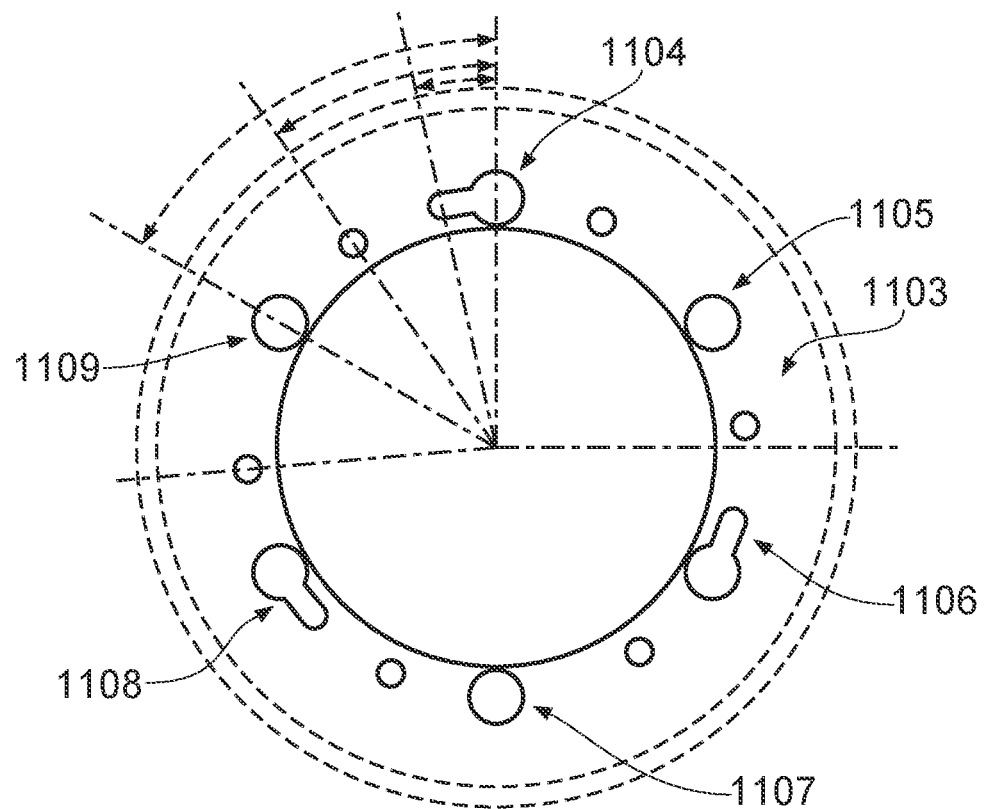

A sprocket carrier 1101, according to another example, a sprocket protector 1102, and an inner portion of a sprocket 1103, according to another example, are shown in FIG. 11.

The inner portion of sprocket 1103 defines six fixing apertures 1104, 1105, 1106, 1107, 1108, 1109 that are spaced around a virtual circumference of the sprocket 1103. Three first apertures 1104, 1106, 1108 of the six fixing apertures 1104-1109 are generally key-hole shaped, and the three second apertures 1105, 1107, 1109 of the six fixing apertures 1104-1109 are generally circle-shaped. The key-hole shaped first fixing apertures 1104, 1106, 1108 each have a generally round first portion having a centre and a generally linear second portion extending circumferentially therefrom (as described previously), the circle-shaped second fixing apertures 1105, 1107, 1109 each have a single generally circular portion having a centre, and the centres of the generally round first portions of the first fixing apertures 1104, 1106, 1108 and the centres of the generally circular portions of the second fixing apertures 1105, 1107, 1109 are spaced equidistantly around a virtual circumference (with 60° spacing), with the first fixing apertures 1104, 1106, 1108 and the second fixing apertures 1105, 1107, 1109 distributed around the virtual circumference in an alternating pattern, as shown.

The sprocket carrier 1101 defines six circular fixing apertures (not visible in this Figure) that are spaced equidistantly around a virtual circumference of the sprocket carrier 101, each of which is provided with a fixing 1110, 1111, 1112, 1113, 1114, 1115 that comprises a bolt. Three first fixings 1110, 1112, 1114 of the six fixings 1110-1115 each present a nut 1116, 1117, 1118 respectively on a sprocket receiving side 1119 of the sprocket carrier 1101, and three second fixings 1111, 1113, 1115 of the six fixings 1110-1115 each present a bolt head 1120, 1121, 1122 respectively on the sprocket receiving side 1119 of the sprocket carrier 1101.

The sprocket 1103 is mountable on the sprocket carrier 1101 into a condition in which the key-hole shaped first fixing apertures 1104, 1106, 1108 of the sprocket 1103 are engaged with the nuts 1116, 1117, 1118 of the first fixings 1110, 1112, 1114 of the sprocket carrier 101 and the circle-shaped second fixing apertures 1105, 1107, 1109 of the sprocket 1103 are fitted around the bolt heads 1120, 1121, 1122 of the second fixings 1111, 1113, 1115 of the sprocket carrier 101. This arrangement provides for improved rotational stability of the sprocket when mounted on the sprocket carrier. In addition, locating the circle-shaped second fixing apertures 1105, 1107, 1109 of the sprocket 1103 on the bolt heads 1120, 1121, 1122 of the second fixings 1111, 1113, 1115 of the sprocket carrier 101 serves to position the sprocket 1103 on the sprocket carrier 101 before the nuts 1116, 1117, 1118 of the first fixings 1110, 1112, 1114 of the sprocket carrier 101 are tightened to fully fit the sprocket 101 to the sprocket carrier 101.

It is to be appreciated that a sprocket may define any suitable number of first fixing apertures having a first shape and equal number of second fixing apertures having a second shape, and the sprocket carrier may then be provided with corresponding numbers of first and second fixings.

Figure 12:
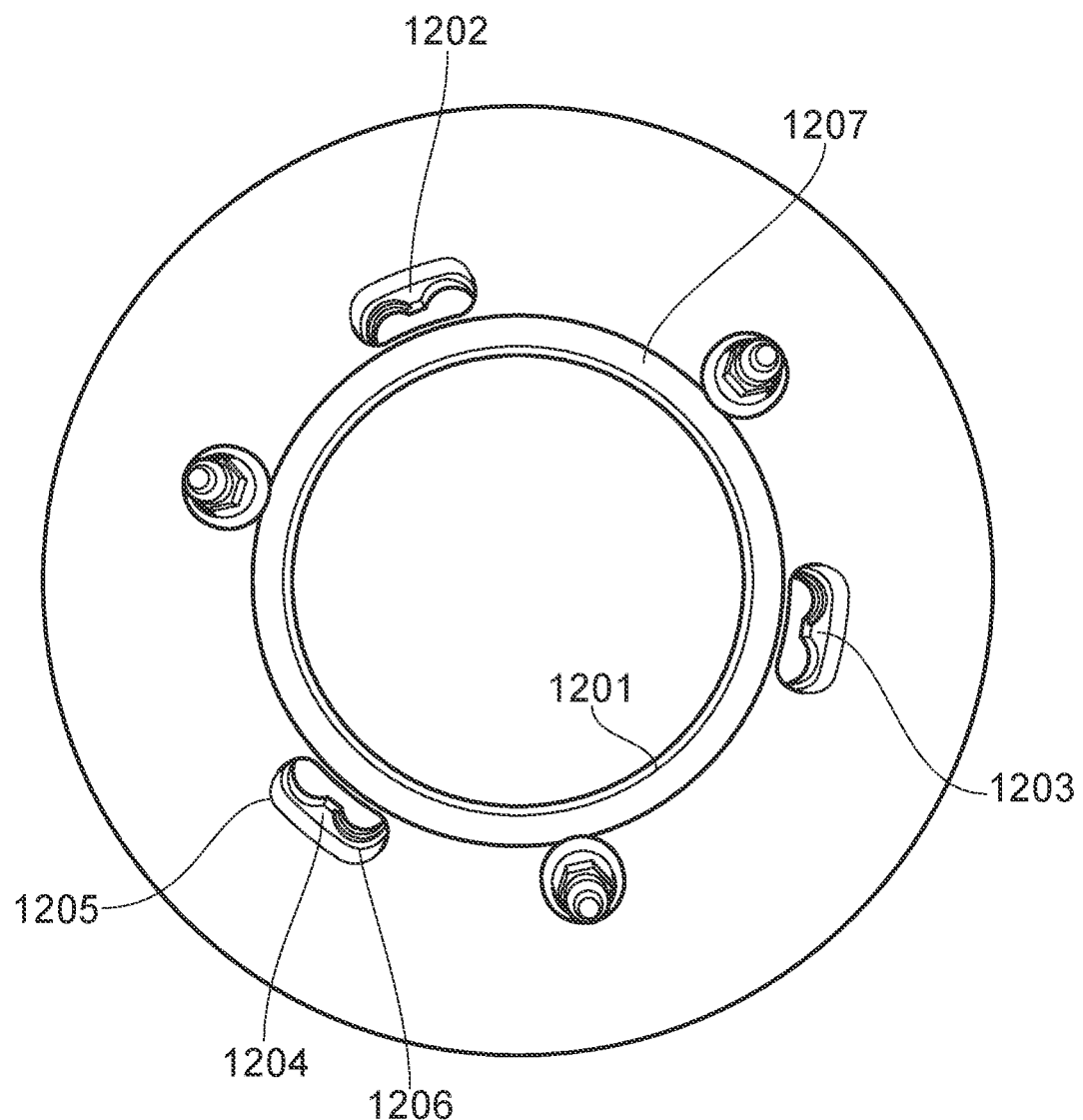
FIG. 12 shows a sprocket protector.

A sprocket protector 1201 according to another example is shown in FIG. 12. The sprocket protector 1201 is provided with three key-hole shaped fixing apertures 1202, 1203, 1204, each of which has a generally round first portion and a generally linear second portion extending circumferentially therefrom (as described previously), such as the generally round first portion 1205 and the generally linear second portion 1206 extending circumferentially therefrom of key-hole shaped fixing aperture 1204. According to this example, the generally linear second portion of each key-hole shaped fixing apertures 1202, 1203, 1204, for example the generally linear second portion 1206 of key-hole shaped fixing aperture 1204, on one side is countersunk or otherwise formed in a recessed manner to accept a nut of a fixing element used in mounting the sprocket protector 1201 in a sprocket assembly.

Although illustrative embodiments and examples of the invention have been disclosed in detail herein, with reference to the accompanying drawings, it is to be understood that the invention is not limited to the precise embodiment and examples shown and/or described and that various changes and modifications can be effected therein by one skilled in the art without departing from the scope of the invention as defined by the appended claims.

The invention claimed is:

1. A sprocket assembly, comprising:
   a sprocket carrier,
   a sprocket, and
   a securing arrangement for releasably securing the sprocket to the sprocket carrier;
   each of the sprocket carrier and the sprocket defines a plurality of fixing apertures for use in securing the sprocket to the sprocket carrier, and
   said securing arrangement comprises a plurality of fixing devices;

each of said plurality of fixing devices comprises a bolt and a nut, the bolt having a head portion, a threaded shank portion and a knurled shank portion, the knurled shank portion disposed between the threaded shank portion and the head portion, and the nut engageable with the threaded shank portion of the bolt;

the bolt of each of said plurality of fixing devices insertable through one of the plurality of fixing apertures of the sprocket carrier into a fitted condition in which the bolt is retained within the sprocket carrier by an interference fit between the knurled shank portion of the bolt and the sprocket carrier; and said sprocket defines a plurality of first fixing apertures for use in releasably securing the sprocket to the sprocket carrier, each of said plurality of first fixing apertures of the sprocket comprises a first portion and a second portion, the second portion extending in a first circumferential direction from the first portion, the first portion shaped to allow the passage of a nut of one of the plurality of fixing devices therethrough and the second portion shaped to prevent the passage of said nut of said one of the plurality of fixing devices therethrough.

2. The sprocket assembly of claim 1, wherein said first portion is a generally round portion and said second portion is a generally linear portion.

3. The sprocket assembly of claim 1, wherein said sprocket defines a plurality of second fixing apertures, each second fixing aperture of said plurality of second fixing apertures comprising a single circular portion.

4. The sprocket assembly of claim 3, wherein said plurality of first fixing apertures comprises three first fixing apertures, said plurality of second fixing apertures comprises three second fixing apertures, and the three fixing apertures of said plurality of first fixing apertures and the three fixing apertures of said plurality of second fixing apertures are spaced about a virtual circumference of said sprocket and are distributed around the virtual circumference in an alternating pattern.

5. The sprocket assembly of claim 1, wherein said sprocket is a split sprocket.

6. The sprocket assembly of claim 1, further comprising a sprocket protector, wherein
said sprocket protector defines a plurality of fixing apertures for use in releasably securing the sprocket protector to the sprocket carrier,
each of said plurality of fixing apertures of the sprocket protector comprises a first portion and a second portion, the second portion extending in a first circumferential direction from the first portion, the first portion shaped to allow the passage of a nut of one of the plurality of fixing devices therethrough and the second portion shaped to prevent the passage of said nut of said one of the plurality of fixing devices therethrough.

7. The sprocket assembly of claim 6, further comprising a second sprocket protector, wherein:
the sprocket carrier has a first side and a second side, the second side opposite the first side;
the sprocket is configured to be mounted to the sprocket carrier from the first side thereof,
the sprocket protector is configured to be mounted to the sprocket carrier from the first side thereof, and
the second sprocket protector is configured to be mounted to the sprocket carrier from the second side thereof.

8. The sprocket assembly of claim 1, wherein each of said plurality of fixing devices comprises a second nut, said threaded shank portion is disposed on a first side of the head portion and the bolt further comprises a second threaded shaft portion that is disposed on a second side of the head portion, the second side opposite said first side, said second nut engageable with the second threaded shaft portion of the bolt.

9. The sprocket assembly of claim 1, wherein the sprocket carrier is a sprocket hub for the rear sprocket of a racing kart.

10. A sprocket for use in the sprocket assembly of claim 1, wherein
said sprocket defines a plurality of first fixing apertures for use in releasably securing the sprocket to a sprocket carrier, and further defines a plurality of second fixing apertures,
each of said plurality of first fixing apertures is generally key-hole shaped and comprises a first generally round portion having a centre and a second generally linear portion, the second portion extending in a first circumferential direction from the first portion, the first portion shaped to allow the passage of a nut of one of the plurality of fixing devices therethrough and the second portion shaped to prevent the passage of said nut of said one of the plurality of fixing devices therethrough,
each of said plurality of second fixing apertures is generally circle-shaped and comprises a single circular portion having a centre, and
the centres of the generally round first portions of the first fixing apertures and the centres of the generally circular portions of the second fixing apertures are spaced equidistantly around a virtual circumference of the sprocket, with the first fixing apertures and the second fixing apertures distributed around the virtual circumference in an alternating pattern.

11. A sprocket protector for use in the sprocket assembly of claim 6, wherein
said sprocket protector defines a plurality of fixing apertures for use in releasably securing the sprocket protector to the sprocket carrier,
each of said plurality of fixing apertures of the sprocket protector comprises a first portion and a second portion, the second portion extending in a first circumferential direction from the first portion, the first portion shaped to allow the passage of a nut of one of the plurality of fixing devices therethrough and the second portion shaped to prevent the passage of said nut of said one of the plurality of fixing devices therethrough.

12. A sprocket carrier for use in the sprocket assembly of claim 1, wherein the sprocket carrier defines a plurality of fixing apertures for use in securing the sprocket to the sprocket carrier, and
the sprocket carrier is provided with a plurality of fixing devices;
each of said plurality of fixing devices comprising a bolt and a nut, the bolt having a head portion, a threaded shank portion and a knurled shank portion, the knurled shank portion disposed between the threaded shank portion and the head portion, and the nut engageable with the threaded shank portion of the bolt; and
the bolt of each of said plurality of fixing devices inserted through one of the plurality of fixing apertures of the sprocket carrier into a fitted condition in which the bolt is retained within the sprocket carrier by an interference fit between the knurled shank portion of the bolt and the sprocket carrier.

13. A vehicle provided with the sprocket assembly of claim 1.

14. A vehicle as claimed in claim 13, wherein said vehicle is a racing kart.

15. The sprocket assembly of claim 2, wherein said sprocket defines a plurality of second fixing apertures, each fixing aperture of said plurality of second fixing apertures comprising a single circular portion.

16. The sprocket assembly of claim 15, wherein said plurality of first fixing apertures comprises three first fixing apertures, said plurality of second fixing apertures comprises three second fixing apertures, and the three fixing apertures of said plurality of first fixing apertures and the three fixing apertures of said plurality of second fixing apertures are spaced about a virtual circumference of said sprocket and are distributed around the virtual circumference in an alternating pattern.

17. The sprocket of claim 10, wherein said plurality of first fixing apertures comprises three first fixing apertures and said plurality of second fixing apertures comprises three second fixing apertures.

18. The sprocket of claim 10, wherein said sprocket is a split sprocket.

* * * * *